United States Patent [19]

Schaetzer et al.

[11] Patent Number: 5,420,258

[45] Date of Patent: May 30, 1995

[54] DISAZO DYES CONTAINING A HYDROXYBENZENE OR ALKOXYBENZENE MIDDLE COMPONENT

[75] Inventors: Jürgen Schaetzer, Rheinfelden, Germany; James C. Posey, Basel, Switzerland

[73] Assignee: Ciba-Geigy Corporation, Ardsley, N.Y.

[21] Appl. No.: 110,271

[22] Filed: Aug. 23, 1993

[30] Foreign Application Priority Data

Aug. 27, 1992 [CH] Switzerland ............ 2663/92

[51] Int. Cl.$^6$ ............ C09B 31/12; C09B 62/59; C09B 62/83; D06P 1/384
[52] U.S. Cl. ............ 534/644; 534/797; 534/829; 534/831
[58] Field of Search ............ 534/797, 829, 831, 644

[56] References Cited

U.S. PATENT DOCUMENTS

| | | | |
|---|---|---|---|
| 4,749,784 | 1/1988 | Fuman | 534/728 |
| 4,840,643 | 6/1989 | Rowe | 8/641 |
| 5,094,665 | 3/1992 | Mausezahl | 8/641 |
| 5,234,467 | 8/1993 | Schaetzer | 8/641 |

FOREIGN PATENT DOCUMENTS

| | | |
|---|---|---|
| 0524147 | 1/1993 | European Pat. Off. . |
| 0524148 | 1/1993 | European Pat. Off. . |
| 2181062 | 11/1973 | France . |
| 2224526 | 10/1974 | France . |
| 1380677 | 1/1975 | United Kingdom . |
| 1432296 | 4/1976 | United Kingdom . |
| 2058815 | 4/1981 | United Kingdom . |

*Primary Examiner*—Mary C. Lee
*Assistant Examiner*—Fiona T. Powers
*Attorney, Agent, or Firm*—Kevin T. Mansfield

[57] ABSTRACT

Azo dyes of formula

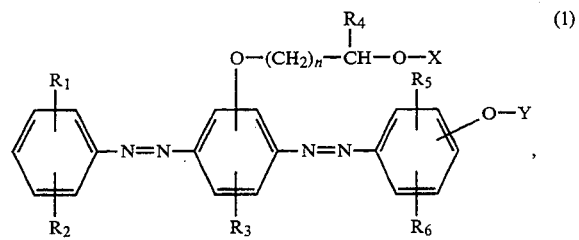

wherein $R_1$, $R_2$, $R_3$, $R_4$, $R_5$, $R_6$, X, Y and n are as defined in claim 1, give dyeings of good fastness properties on nitrogen-containing or hydroxyl group containing fibre materials.

12 Claims, No Drawings

DISAZO DYES CONTAINING A HYDROXYBENZENE OR ALKOXYBENZENE MIDDLE COMPONENT

The present invention relates to novel azo dyes, to a process for their preparation and to the use of these dyes for dyeing and printing fibre materials, especially textile fibre materials.

Specifically, the invention relates to azo dyes of formula

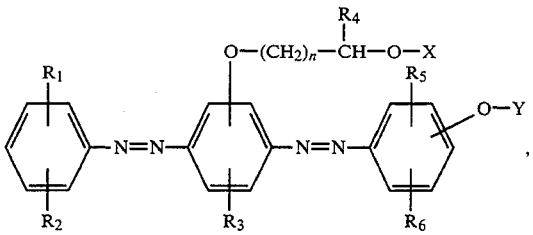

wherein $R_1$, $R_2$, $R_5$ and $R_6$ are each independently of one another hydrogen, $C_1$–$C_4$alkyl, $C_1$–$C_4$alkoxy, halogen, sulfo, unsubstituted $C_2$–$C_4$alkanoylamino or $C_2$–$C_4$alkanoylamino which is substituted by hydroxy, sulfo or sulfato, or are a radical of formula —$SO_2N(R_7)R_8$,

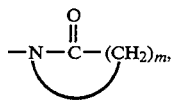

$R_7$ is hydrogen or $C_1$–$C_4$alkyl, $R_8$ is a radical of formula —$(CH_2)_{1-4}$—$SO_3H$ and m is 3, 4 or 5, $R_3$ is hydrogen, $C_1$–$C_4$alkyl, C–$C_4$alkoxy, unsubstituted $C_2$–$C_4$alkanoylamino or $C_2$–$C_4$alkanoylamino which is substituted by hydroxy, sulfo or sulfato, or is halogen or sulfo, $R_4$ is hydrogen or $C_1$–$C_4$alkyl, X is hydrogen, $C_1$–$C_4$alkyl, $C_2$–$C_4$hydroxyalkyl or sulfo, Y is hydrogen, $C_1$–$C_8$alkyl, $C_2$–$C_8$sulfatoalkyl, $C_2$–$C_8$ hydroxyalkyl, $C_2$–$C_8$alkyl which is interrupted in the chain by the group —O—,

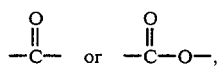

or is $C_3$–$C_8$alkenyl, $C_3$–$C_8$alkynyl or a radical of formula

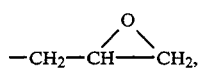

n is 1, 2, 3 or 4, and which azo dyes of formula (1) contain at least one sulfo or sulfato group;

with the proviso that, in the azo dyes of formula (1), at least one of the substituents $R_1$, $R_2$, $R_5$ and $R_6$ is unsubstituted $C_2$–$C_4$alkanoylamino or $C_2$–$C_4$alkanoylamino which is substituted by hydroxy, sulfo or sulfato or is a radical of formula —$SO_2N(R_7)R_8$,

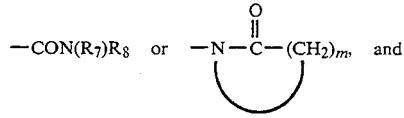

$R_7$, $R_8$ and m are as defined above; or

X is $C_1$–$C_4$alkyl, $C_2$–$C_4$hydroxyalkyl or sulfo; or

Y is $C_3$–$C_7$alkyl, $C_2$–$C_8$sulfatoalkyl, $C_2$–$C_8$alkyl which is interrupted in the chain by the group —O—,

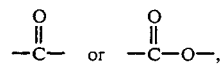

or is $C_3$–$C_8$alkenyl, $C_3$–$C_8$alkynyl or a radical of formula

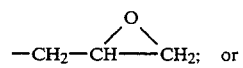

n is 2, 3 or 4.

$R_1$, $R_2$, $R_3$, $R_4$, $R_5$, $R_6$, $R_7$ and X defined as $C_1$–$C_4$alkyl are typically methyl, ethyl, propyl, isopropyl, butyl, sec-butyl, tert-butyl or isobutyl. Methyl is preferred.

$R_1$, $R_2$, $R_3$, $R_5$ and $R_6$ defined as $C_1$–$C_4$alkoxy are typically methoxy, ethoxy, propoxy, isopropoxy, butoxy or isobutoxy. Methoxy is preferred.

$R_1$, $R_2$, $R_3$, $R_5$ and $R_6$ defined as halogen will typically be fluoro, chloro or bromo. Chloro is preferred.

$R_1$, $R_2$, $R_3$, $R_5$ and $R_6$ defined as unsubstituted $C_2$–$C_4$alkanoylamino or $C_2$–$C_4$alkanoylamino which is substituted by hydroxy, sulfo or sulfato will typically be acetylamino or propionylamino, most preferably acetylamino, which radicals may be substituted as indicated. It is preferred that $R_1$, $R_2$, $R_3$, $R_5$ and $R_6$ having the sugnificance of alkanoylamino are unsubstituted.

The substituent $R_8$ is preferably a group of formula —$CH_2CH_2$—$SO_3H$.

m is is preferably 3 or 4 and is most preferably 3.

X defined as $C_2$–$C_4$hydroxyalkyl is hydroxy-substituted ethyl, propyl, isopropyl, butyl, sec-butyl, tert-butyl or isobutyl.

Y defined as $C_1$–$C_8$alkyl may be in straight or branched chain configuration. Typical examples are methyl, ethyl, propyl, isopropyl, butyl, sec-butyl, tert-butyl, isobutyl, as well as straight chain or branched pentyl, hexyl, heptyl or octyl. The radical Y having the significance of $C_1$–$C_8$alkyl is preferably $C_1$–$C_4$alkyl. Y defined as $C_2$–$C_8$sulfatoalkyl may suitably be exemplified by the sulfato-substituted alkyl radicals cited above. Y defined as $C_2$–$C_8$hydroxyalkyl may suitably be exemplified by the hydroxy-substituted alkyl radicals cited above, with the exception of methyl.

The radical Y defined as $C_2$–$C_8$alkyl which is interrupted in the chain by the group —O—,

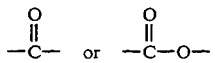

may contain straight chain or branched alkyl radicals. Preferably Y is $C_2$–$C_4$alkyl which is interrupted by the indicated radicals. Illustrative examples of such radicals Y are:

—CH$_2$CH$_2$—O—CH$_2$CH$_3$, —CH$_2$CH$_2$—O—CH$_3$,

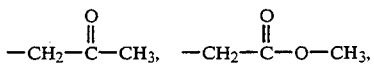

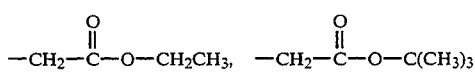

and 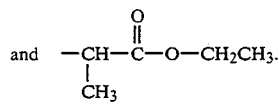

Y defined as C$_3$–C$_8$alkenyl is preferably C$_3$–C$_4$alkenyl. Illustrative examples are —CH$_2$—CH=CH$_2$, —CH$_2$—CH=CH—CH$_3$ and —CH(CH$_3$)—CH=CH$_2$.

Y defined as C$_3$–C$_8$alkynyl is preferably C$_3$–C$_4$alkynyl.

The substituent R$_1$ is preferably hydrogen, C$_1$–C$_4$alkyl, C$_1$–C$_4$alkoxy, C$_2$–C$_4$alkanoylamino, halogen or sulfo, and is most preferably hydrogen or sulfo.

R$_2$ and R$_5$ are each independently of the other preferably hydrogen, C$_1$–C$_4$alkyl, C$_1$–C$_4$alkoxy, halogen, unsubstituted C$_2$–C$_4$alkanoylamino or C2-C4alkanoylamino which is substituted by hydroxy, sulfo or sulfato, or are a radical of formula

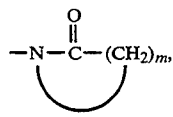

where m has the meanings and preferred meanings given above.

R$_3$ is preferably hydrogen, C$_1$–C$_4$alkyl, C$_1$–C$_4$alkoxy, C$_2$–C$_4$alkanoylamino or halogen, more particularly hydrogen or C$_1$–C$_4$alkyl and, most preferably, hydrogen or methyl.

R$_4$ is preferably hydrogen.

R$_6$ is preferably hydrogen or C$_1$–C$_4$alkyl, C$_1$–C$_4$alkoxy, C$_2$–C$_4$alkanoylamino or halogen, most preferably hydrogen.

X is preferably hydrogen, C$_1$–C$_4$alkyl or sulfo, most preferably hydrogen or C$_1$ C$_4$alkyl.

Y is preferably C$_1$–C$_8$alkyl, C$_2$–C$_8$sulfatoalkyl, C$_2$–C$_8$alkyl which is interrupted in the chain by the group —O—,

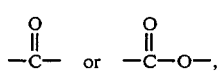

or is C$_3$–C$_8$alkenyl, C$_3$–C$_8$alkynyl or a radical of formula

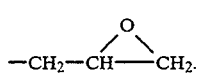

Y is most preferably C$_1$–C$_8$alkyl, C$_2$–C$_8$alkyl which is interrupted in the chain by the group —O—,

or C$_3$–C$_8$alkenyl.

n is preferably 1 or 2, most preferably 1.

Particularly preferred azo dyes of formula (1) are those wherein R$_1$ is hydrogen or sulfo, R$_2$ and R$_5$ are each independently of the other hydrogen, C$_1$–C$_4$alkyl, C$_1$–C$_4$alkoxy, halogen, unsubstituted C$_2$–C$_4$alkanoylamino or C$_2$–C$_4$alkanoylamino which is substituted by hydroxy, sulfo or sulfato, or are a radical of formula

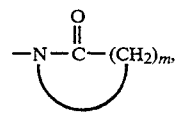

wherein
m is 3, 4 or 5, and R$_6$ is hydrogen.

Very particularly preferred azo dyes of formula (1) are those wherein R$_1$ is hydrogen or sulfo, R$_2$ and R$_5$ are each independently of the other hydrogen, C$_1$–C$_4$alkyl, C$_1$–C$_4$alkoxy, halogen, unsubstituted C$_2$–C$_4$alkanoylamino or C$_2$–C$_4$alkanoylamino which is substituted by hydroxy, sulfo or sulfato, or are a radical of formula

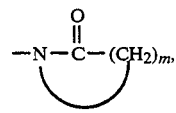

wherein m is 3, 4 or 5, R$_3$ is hydrogen or C$_1$–C$_4$alkyl, R$_4$ and R$_6$ are each hydrogen and X, Y and n have the meanings and preferred meanings given above;
with the proviso that, in the azo dye of formula (1), at least one of the substituents R$_2$ and R$_5$ is unsubstituted C$_2$–C$_4$alkanoylamino or C$_2$–C$_4$alkanoylamino which is substituted by hydroxy, sulfo or sulfato, or is a radical of formula

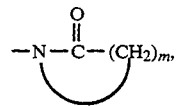

wherein
m has the meanings given above; or
X is C$_1$–C$_4$alkyl, C$_2$–C$_4$hydroxyalkyl or sulfo; or
Y is C$_3$–C$_8$alkyl, C$_2$–C$_8$sulfatoalkyl, C$_2$–C$_8$alkyl which is interrupted in the chain by the group —O—,

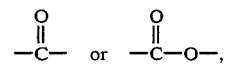

or is C$_3$–C$_8$alkenyl, C$_3$–C$_8$alkynyl or a radical of formula

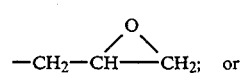

n is 2, 3 or 4.

A group of interesting azo dyes of formula (1) comprises those dyes wherein n is 2, 3 or 4, preferably 2, and R$_1$, R$_2$, R$_3$, R$_4$, R$_5$, R$_6$, X and Y have the meanings and preferred meanings given above.

A further group of interesting azo dyes of formula (1) comprises those dyes wherein X is $C_1$-$C_4$alkyl, $C_2$-$C_4$hydroxyalkyl or sulfo, preferably $C_1$-$C_4$alkyl or sulfo and, most preferably, $C_1$-$C_4$alkyl. In these dyes, $R_1$, $R_2$, $R_3$, $R_4$, $R_5$, $R_6$ and Y have the meanings and preferred meanings given above, and n is 1, 2, 3 or 4, preferably 1 or 2 and, most preferably, 1.

A group of particularly interesting azo dyes of formula (1) comprises those dyes wherein Y is $C_3$-$C_8$alkyl, $C_2$-$C_8$sulfatoalkyl, $C_2$-$C_8$alkyl which is interrupted in the chain by the group —O—,

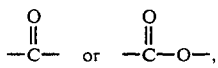

or is $C_3$-$C_8$alkenyl, $C_3$-$C_8$alkynyl or a radical of formula

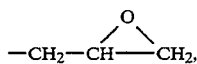

and $R_1$, $R_2$, $R_3$, $R_4$, $R_5$ and $R_6$ have the meanings and preferred meanings given above, n is 1, 2, 3 or 4, preferably 1 or 2 and, most preferably, 1, and X is hydrogen, $C_1$-$C_4$alkyl, $C_2$-$C_4$hydroxyalkyl or sulfo, preferably hydrogen, $C_1$-$C_4$alkyl or sulfo and, most preferably, hydrogen or $C_1$-$C_4$alkyl. In this group of particularly interesting azo dyes, the preferred meaning of Y is $C_3$-$C_8$alkyl, $C_2$-$C_8$alkyl which is interrupted in the chain by the group —O—,

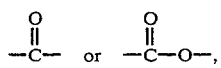

or $C_3$-$C_8$alkenyl. The particularly preferred meaning of Y in this group of azo dyes is $C_2$-$C_8$alkyl which is interrupted in the chain by the group —O—,

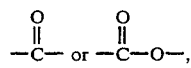

or $C_3$-$C_8$alkeny. $C_3$-$C_8$Alkenyl is most preferred.

Of very particular interest are azo dyes of formula (1), wherein one of $R_2$ and $R_5$ is unsubstituted $C_2$-$C_4$alkanoylamino or $C_2$-$C_4$alkanoylamino which is substituted by hydroxy, sulfo or sulfato or is a radical of formula

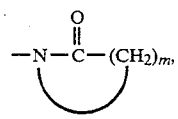

where m is 3, 4 or 5, and $R_1$, $R_3$, $R_4$, $R_6$ and the other substituent $R_5$ or $R_2$ have the meanings and preferred meanings given above, n is 1, 2, 3 or 4, preferably 1 or 2 and, most preferably, 1, X is hydrogen, $C_1$-$C_4$alkyl, $C_2$-$C_4$hydroxyalkyl or sulfo, preferably hydrogen, $C_1$-$C_4$alkyl or sulfo and, most preferably, hydrogen or $C_1$-$C_4$alkyl, and Y is hydrogen, $C_1$-$C_8$alkyl, $C_2$-$C_8$sulfatoalkyl, $C_2$-$C_8$hydroxyalkyl, $C_2$-$C_8$alkyl which is interrupted in the chain by the group —O—

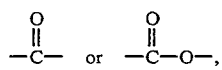

or is $C_3$-$C_8$alkenyl, $C_3$-$C_8$alkynyl or a radical of formula

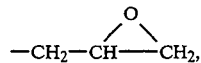

preferably $C_1$-$C_8$alkyl, $C_2$-$C_8$sulfatoalkyl, $C_2$-$C_8$alkyl which is interrupted in the chain by the group —O—,

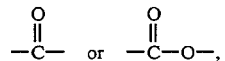

or is $C_3$-$C_8$alkenyl, $C_3$-$C_8$alkynyl or a radical of formula

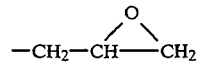

and, preferably $C_1$-$C_8$alkyl, $C_2$-$C_8$alkyl which is interrupted in the chain by the group —O—,

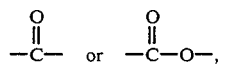

or is $C_3$-$C_8$alkenyl.

Particularly important azo dyes of this invention are those of formula

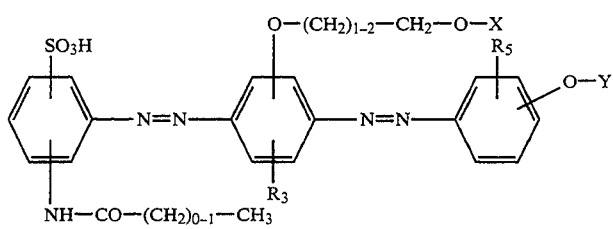

(3)

or

-continued

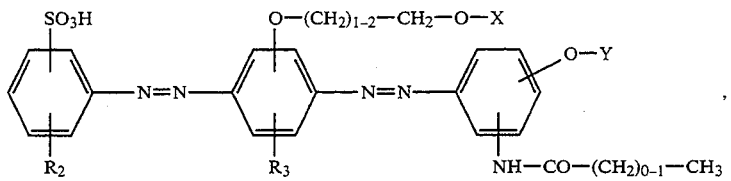

wherein $R_3$ is hydrogen or $C_1$–$C_4$alkyl, $R_2$ and $R_5$ are hydrogen, $C_1$–$C_4$alkyl, $C_1$–$C_4$alkoxy, halogen or a radical of formula —NH—CO—$(CH_2)_{0-1}$—$CH_3$, and X and Y have the meanings and preferred meanings cited in connection with the particularly interesting azo dyes.

The invention further relates to a process for the preparation of the azo dyes of formula (1), which comprises diazotising an amine of formula

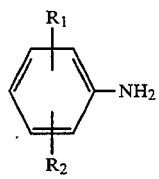

(5)

coupling the diazotised amine to a coupling component of formula

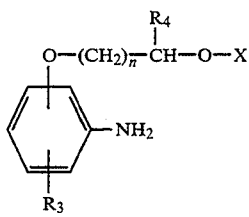

(6)

diazotising the reaction product of formula

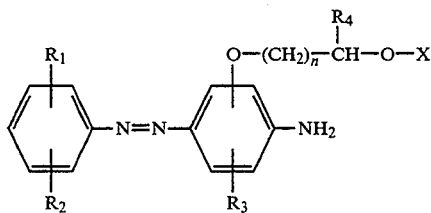

(7)

and coupling to a coupling component of formula

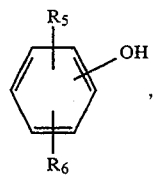

(8)

or diazotising a compound of formula (7) and coupling the reaction product to a compound of formula (8), then, if desired, reacting the resultant dye with a compound that introduces the radical —Y and carrying out a further optional conversion reaction, the substituents $R_1$, $R_2$, $R_3$, $R_4$, $R_5$, $R_6$, X, Y and n in the above formulae having the same meanings as for formula (1).

The diazotisation of the compounds of formulae (5) and (7) is carried out in a manner known per se, conveniently with a nitrite, typically an alkali metal nitrite such as sodium nitrite, in a medium containing a mineral acid, typically in a medium containing hydrochloric acid medium, in the temperature range from typically −5° to +30° C., preferably from 0° to 10° C.

The coupling to the coupling components of formulae (6) and (8) is carried out in a manner known per se, in the acid, neutral or weakly alkaline pH range and in the temperature range from typically −5° to +30° C., preferably from 0° to 15° C.

The radical -Y is introduced by conveniently using compounds of formula Z—Y, wherein Z is halogen such as chloro, bromo or iodo, alkylsulfonate or p-tosylate. For introducing the radical -Y it is preferred to use compounds of formula Z—Y, wherein Z is halogen, preferably bromine. If the radical -Y is methyl, the introduction of this radical is preferably effected with dimethyl methanephosphonate or dimethyl sulfate. If the radical -Y is ethyl, it is preferably introduced with diethyl sulfate.

The reaction with compounds of formula Z—Y above can normally be carried out in dipolar aprotic solvents such as dimethyl formamide, dimethyl sulfoxide, N-methylpyrrolidone or dimethyl acetamide, in the presence of a base such as an alkali metal carbonate or alkali metal hydroxide, conveneniently sodium carbonate, potassium carbonate or sodium hydroxide, in the temperature range from 60° to 100° C., preferably from 60° to 80° C.

The reaction with dimethyl sulfate, diethyl sulfate, dimethyl methanephosphonate or compounds of formula Z—Y, wherein Y contains no ester function or no epoxide ring, is normally carried out in aqueous medium, in the presence of a base, typically an alkali metal carbonate or alkali metal hydroxide such as sodium carbonate, potassium carbonate or sodium hydroxide, in the temperature range from 40° to 80° C., preferably from 50° to 70° C., and in the pH range from 8 to 12, preferably from 10 to 12.

A suitable further conversion reaction which can be carried out after the synthesis of the dye is sulfonation or sulfation. To prepare azo dyes in which X is sulfo and/or Y is sulfatoalkyl, the corresponding radicals wherein X is hydrogen and/or Y is hydroxyalkyl are reacted with concentrated sulfuric acid. The reaction is carried out in the temperature range from 0° to 25° C., preferably from 0° to 10° C.

In the process of this invention for the preparation of azo dyes of formula (1), the substituents of the compounds of formulae (5), (6), (7) and (8) have the preferred meanings stated above.

The compounds of formulae (5), (6) and (8) are known or can be prepared by methods analogous to those employed for preparing known ones.

The azo dyes of formula (1) are obtained either in the form of their free acid or, preferably, as salts thereof.

Suitable salts are typically the alkali metal salts or ammonium salts or the salts of an organic amine.

Illustrative examples of such salts are the sodium, lithium, potassium or ammonium salts or the salt of mono-, di- or triethanolamine.

The novel azo dyes of formula (1) are suitable for dyeing and printing by per se known methods, especially for dyeing and printing nitrogen-containing or hydroxyl group containing fibre materials, typically including texile fibre materials made from cellulose, silk and, preferably, wool and synthetic polyamides. It is preferred to dye and print natural or synthetic polyamide fibre materials. The novel azo dyes of formula (1) can be used for dyeing and printing in standard and, if desired, in previously prepared formulation. Level dyeings in yellow to orange shades of good allround fastness properties are obtained, especially good rubfastness, wetfastness, wet rubfastness and lightfastness. In addition, the novel dyes are readily water-soluble. The novel dyes furthermore have good compatibility with other dyes. The textile material can be in any form of presentation, typically fibres, yarn, woven or knitted fabrics.

The invention is illustrated by the following Examples in which parts are by weight. The relationship between parts by weight and parts by volume is the same as between the gram and the cubic centimeter.

EXAMPLE 1

17.3 parts of sulfanilic acid are suspended in 100 parts of water and to this suspension are slowly added 5.4 pans of sodium carbonate. To the resultant solution are then added a solution of 7 parts of sodium nitrite in 26 pans of water and 116 pans of ice. Then 21 pans of concentrated hydrochloric acid are added and diazotisation is carried out in conventional manner at 0°-5° C. After 2 hours, excess nitrite is destroyed with a minor amount sulfamic acid. The diazotisation mixture is slowly run into a solution, cooled to 0°-5° C., of 17 parts of 2-(2-amino-4-methylphenoxy)ethanol in 100 parts of 2N hydrochloric acid, while keeping the pH constant at c. 6.5 by addition of solid sodium carbonate. The coupling is complete after stirring for 2 hours at 0°-5° C. The pH is adjusted to c. 4 with 4N hydrochloric acid and the precipitate is filtered with suction, washed with water and dried at 80° C. in a drying oven. Yield: 34 pans of a monoazo dye.

34 parts of this monoazo dye are dissolved in 800 parts of water at 45° C. by adding a minor amount of a 30% solution of sodium hydroxide. The pH is then 8–9. With stirring, a solution of 7 parts of sodium nitrite in 26 parts of water and 80 parts of an aqueous solution of 1-naphthalenesulfonic acid (31%) are added to this solution and, after stirring for 1 hour at 45° C., the diazotisation is complete. Excess nitrite is destroyed with sulfamic acid and the precipitated diazonium salt is filtered with suction. The moist paste of the diazonium salt is then slowly added to a weakly alkaline solution, cooled to 0° C., of 10 parts of phenol in 300 parts of water. The coupling is complete after stirring for several hours at 0°–5° C. and at a pH of c.8.5. To the dark red solution are added a total amount of 600 parts of 4N hydrochloric acid and the bisazo dye is collected by suction filtration and dried. Yield: 37 parts of a brown powder.

5 parts of this bisazo dye are dissolved in 150 parts of dimethyl formamide and, after addition of 5.5 parts of finely ground potassium carbonate, the solution is heated to 70° C. To the brown solution are slowly added 1.3 parts of allyl bromide. After c. 2 hours the etherification is complete. The batch is cooled to room temperature, the potassium carbonate is removed by filtration, and the orange solution is concentrated to dryness. The residue is treated with isopropanol, whereupon a fine orange precipitate forms. Recrystallisation from a mixture of ethanol/water and drying gives 4.2 parts of an orange dye that, in the form of the free acid, corresponds to the compound of formula

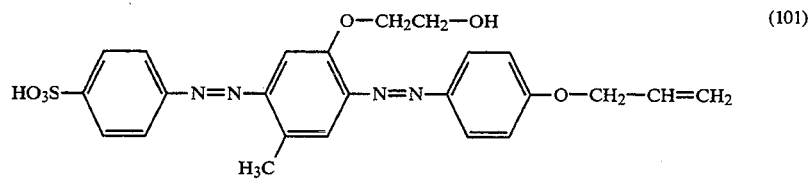

(101)

The dye of formula (101) dyes natural and synthetic polyamide fibre material in orange shades.

EXAMPLES 2 TO 84

The dyes of formula

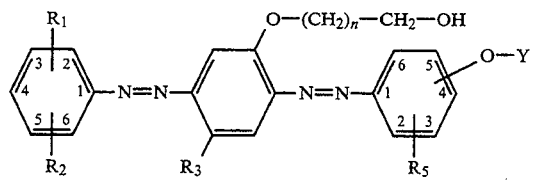

wherein $R_1$, $R_2$, $R_3$, $R_5$, —O—Y and n have the meanings given in the following Table 1, can be obtained in the form of the free acid in general accordance with the procedure described in Example 1. To introduce the radical -Y, suitable compounds of formula Br—Y are used. Yellow dyeings are produced on natural and synthetic polymide fibre material with the dyes listed in Table 1.

TABLE 1

| Ex. | $R_1$ | $R_2$ | $R_3$ | $R_5$ | n | —O—Y |
|---|---|---|---|---|---|---|
| 2 | 4-SO$_3$H | —H | —CH$_3$ | —H | 1 | 4-OCH$_2$CH$_2$CH$_3$ |
| 3 | 3-SO$_3$H | —H | —CH$_3$ | —H | 1 | 4-OCH$_2$CH$_2$CH$_3$ |
| 4 | 2-SO$_3$H | —H | —CH$_3$ | —H | 1 | 4-OCH$_2$CH$_2$CH$_3$ |
| 5 | 4-SO$_3$H | —H | —CH$_3$ | 3-CH$_3$ | 1 | 4-OCH$_2$CH$_2$CH$_3$ |
| 6 | 3-SO$_3$H | —H | —CH$_3$ | 3-CH$_3$ | 1 | 4-OCH$_2$CH$_2$CH$_3$ |
| 7 | 2-SO$_3$H | —H | —CH$_3$ | 3-CH$_3$ | 1 | 4-OCH$_2$CH$_2$CH$_3$ |
| 8 | 4-SO$_3$H | —H | —CH$_3$ | 3-OCH$_3$ | 1 | 4-OCH$_2$CH$_2$CH$_3$ |
| 9 | 3-SO$_3$H | —H | —CH$_3$ | 3-OCH$_3$ | 1 | 4-OCH$_2$CH$_2$CH$_3$ |
| 10 | 2-SO$_3$H | —H | —CH$_3$ | 3-OCH$_3$ | 1 | 4-OCH$_2$CH$_2$CH$_3$ |

TABLE 1-continued

| Ex. | $R_1$ | $R_2$ | $R_3$ | $R_5$ | n | —O—Y |
|---|---|---|---|---|---|---|
| 11 | 4-SO$_3$H | —H | —CH$_3$ | —H | 1 | 4-OCH(CH$_3$)$_2$ |
| 12 | 3-SO$_3$H | —H | —CH$_3$ | —H | 1 | 4-OCH(CH$_3$)$_2$ |
| 13 | 2-SO$_3$H | —H | —CH$_3$ | —H | 1 | 4-OCH(CH$_3$)$_2$ |
| 14 | 4-SO$_3$H | —H | —CH$_3$ | 3-CH$_3$ | 1 | 4-OCH(CH$_3$)$_2$ |
| 15 | 3-SO$_3$H | —H | —CH$_3$ | 3-CH$_3$ | 1 | 4-OCH(CH$_3$)$_2$ |
| 16 | 2-SO$_3$H | —H | —CH$_3$ | 3-CH$_3$ | 1 | 4-OCH(CH$_3$)$_2$ |
| 17 | 4-SO$_3$H | —H | —CH$_3$ | 3-OCH$_3$ | 1 | 4-OCH(CH$_3$)$_2$ |
| 18 | 3-SO$_3$H | —H | —CH$_3$ | 3-OCH$_3$ | 1 | 4-OCH(CH$_3$)$_2$ |
| 19 | 2-SO$_3$H | —H | —CH$_3$ | 3-OCH$_3$ | 1 | 4-OCH(CH$_3$)$_2$ |
| 20 | 4-SO$_3$H | —H | —CH$_3$ | 5-CH$_3$ | 1 | 2-OCH$_2$CH$_2$CH$_3$ |
| 21 | 3-SO$_3$H | —H | —CH$_3$ | 5-CH$_3$ | 1 | 2-OCH$_2$CH$_2$CH$_3$ |
| 22 | 2-SO$_3$H | —H | —CH$_3$ | 5-CH$_3$ | 1 | 2-OCH$_2$CH$_2$CH$_3$ |
| 23 | 4-SO$_3$H | —H | —CH$_3$ | 5-CH$_3$ | 1 | 2-OCH(CH$_3$)$_2$ |
| 24 | 3-SO$_3$H | —H | —CH$_3$ | 5-CH$_3$ | 1 | 2-OCH(CH$_3$)$_2$ |
| 25 | 2-SO$_3$H | —H | —CH$_3$ | 5-CH$_3$ | 1 | 2-OCH(CH$_3$)$_2$ |
| 26 | 4-SO$_3$H | —H | —CH$_3$ | —H | 1 | 4-O—(CH$_2$)$_3$—CH$_3$ |
| 27 | 3-SO$_3$H | —H | —CH$_3$ | —H | 1 | 4-O—(CH$_2$)$_3$—CH$_3$ |
| 28 | 2-SO$_3$H | —H | —CH$_3$ | —H | 1 | 4-O—(CH$_2$)$_3$—CH$_3$ |
| 29 | 4-SO$_3$H | —H | —CH$_3$ | —H | 1 | 4-O—CH$_2$—CH(CH$_3$)$_2$ |
| 30 | 3-SO$_3$H | —H | —CH$_3$ | —H | 1 | 4-O—CH$_2$—CH(CH$_3$)$_2$ |
| 31 | 2-SO$_3$H | —H | —CH$_3$ | —H | 1 | 4-O—CH$_2$—CH(CH$_3$)$_2$ |
| 32 | 4-SO$_3$H | —H | —CH$_3$ | —H | 1 | 4-O—C(CH$_3$)$_3$ |
| 33 | 3-SO$_3$H | —H | —CH$_3$ | —H | 1 | 4-O—C(CH$_3$)$_3$ |
| 34 | 2-SO$_3$H | —H | —CH$_3$ | —H | 1 | 4-O—C(CH$_3$)$_3$ |
| 35 | 4-SO$_3$H | —H | —CH$_3$ | —H | 1 | 4-O—CH(CH$_3$)—CH$_2$CH$_3$ |
| 36 | 3-SO$_3$H | —H | —CH$_3$ | —H | 1 | 4-O—CH(CH$_3$)—CH$_2$CH$_3$ |
| 37 | 2-SO$_3$H | —H | —CH$_3$ | —H | 1 | 4-O—CH(CH$_3$)—CH$_2$CH$_3$ |
| 38 | 3-SO$_3$H | —H | —CH$_3$ | —H | 1 | 4-O—CH$_2$—CH=CH$_2$ |
| 39 | 2-SO$_3$H | —H | —CH$_3$ | —H | 1 | 4-O—CH$_2$—CH=CH$_2$ |
| 40 | 4-SO$_3$H | —H | —CH$_3$ | —H | 1 | 4-O—CH$_2$—CH=CH—CH$_3$ |
| 41 | 3-SO$_3$H | —H | —CH$_3$ | —H | 1 | 4-O—CH$_2$—CH=CH—CH$_3$ |
| 42 | 2-SO$_3$H | —H | —CH$_3$ | —H | 1 | 4-O—CH$_2$—CH=CH—CH$_3$ |
| 43 | 4-SO$_3$H | —H | —CH$_3$ | —H | 1 | 4-O—CH(CH$_3$)—CH=CH$_2$ |
| 44 | 3-SO$_3$H | —H | —CH$_3$ | —H | 1 | 4-O—CH(CH$_3$)—CH=CH$_2$ |
| 45 | 2-SO$_3$H | —H | —CH$_3$ | —H | 1 | 4-O—CH(CH$_3$)—CH=CH$_2$ |
| 46 | 4-SO$_3$H | —H | —CH$_3$ | —H | 1 | 4-O—CH$_2$CH$_2$—OCH$_3$ |
| 47 | 3-SO$_3$H | —H | —CH$_3$ | —H | 1 | 4-O—CH$_2$CH$_2$—OCH$_3$ |
| 48 | 2-SO$_3$H | —H | —CH$_3$ | —H | 1 | 4-O—CH$_2$CH$_2$—OCH$_3$ |
| 49 | 4-SO$_3$H | —H | —CH$_3$ | —H | 1 | 4-O—CH$_2$CH$_2$—OCH$_2$CH$_3$ |
| 50 | 3-SO$_3$H | —H | —CH$_3$ | —H | 1 | 4-O—CH$_2$CH$_2$—OCH$_2$CH$_3$ |
| 51 | 2-SO$_3$H | —H | —CH$_3$ | —H | 1 | 4-O—CH$_2$CH$_2$—OCH$_2$CH$_3$ |
| 52 | 4-SO$_3$H | —H | —CH$_3$ | —H | 1 | 4-O—CH$_2$—COOCH$_3$ |
| 53 | 3-SO$_3$H | —H | —CH$_3$ | —H | 1 | 4-O—CH$_2$—COOCH$_3$ |
| 54 | 2-SO$_3$H | —H | —CH$_3$ | —H | 1 | 4-O—CH$_2$—COOCH$_3$ |
| 55 | 4-SO$_3$H | —H | —CH$_3$ | —H | 1 | 4-O—CH$_2$—COOCH$_2$CH$_3$ |
| 56 | 3-SO$_3$H | —H | —CH$_3$ | —H | 1 | 4-O—CH$_2$—COOCH$_2$CH$_3$ |
| 57 | 2-SO$_3$H | —H | —CH$_3$ | —H | 1 | 4-O—CH$_2$—COOCH$_2$CH$_3$ |
| 58 | 4-SO$_3$H | —H | —CH$_3$ | —H | 1 | 4-O—CH(CH$_3$)—COOCH$_2$CH$_3$ |
| 59 | 3-SO$_3$H | —H | —CH$_3$ | —H | 1 | 4-O—CH(CH$_3$)—COOCH$_2$CH$_3$ |
| 60 | 2-SO$_3$H | —H | —CH$_3$ | —H | 1 | 4-O—CH(CH$_3$)—COOCH$_2$CH$_3$ |
| 61 | 4-SO$_3$H | —H | —CH$_3$ | —H | 1 | 4-O—CH$_2$—COOC(CH$_3$)$_3$ |
| 62 | 3-SO$_3$H | —H | —CH$_3$ | —H | 1 | 4-O—CH$_2$—COOC(CH$_3$)$_3$ |
| 63 | 2-SO$_3$H | —H | —CH$_3$ | —H | 1 | 4-O—CH$_2$—COOC(CH$_3$)$_3$ |
| 64 | 4-SO$_3$H | —H | —CH$_3$ | —H | 1 | 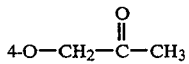 |
| 65 | 3-SO$_3$H | —H | —CH$_3$ | —H | 1 | 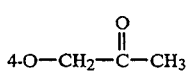 |
| 66 | 2-SO$_3$H | —H | —CH$_3$ | —H | 1 | 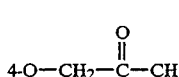 |
| 67 | 4-SO$_3$H | —H | —CH$_3$ | —H | 1 |  |
| 68 | 3-SO$_3$H | —H | —CH$_3$ | —H | 1 | 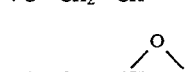 |
| 69 | 2-SO$_3$H | —H | —CH$_3$ | —H | 1 | 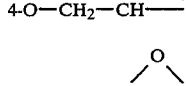 |
| 70 | 4-SO$_3$H | —H | —CH$_3$ | 3-CH$_3$ | 1 | 4-O—CH$_2$—COOCH$_2$CH$_3$ |
| 71 | 4-SO$_3$H | —H | —CH$_3$ | 3-CH$_3$ | 1 | 4-O—CH$_2$CH$_2$—OCH$_3$ |

TABLE 1-continued

| Ex. | R1 | R2 | R3 | R5 | n | —O—Y |
|---|---|---|---|---|---|---|
| 72 | 4-SO$_3$H | —H | —CH$_3$ | 3-CH$_3$ | 1 | 4-O—CH$_2$—C(=O)—CH$_3$ |
| 73 | 4-SO$_3$H | —H | —CH$_3$ | 3-NHCOCH$_3$ | 1 | 4-O—CH$_2$CH$_2$CH$_3$ |
| 74 | 3-SO$_3$H | —H | —CH$_3$ | 3-NHCOCH$_3$ | 1 | 4-O—CH$_2$CH$_2$CH$_3$ |
| 75 | 2-SO$_3$H | —H | —CH$_3$ | 3-NHCOCH$_3$ | 1 | 4-O—CH$_2$CH$_2$CH$_3$ |
| 76 | 4-SO$_3$H | —H | —CH$_3$ | 3-NHCOCH$_3$ | 1 | 4-O—CH$_2$—CH=CH$_2$ |
| 77 | 3-SO$_3$H | —H | —CH$_3$ | 3-NHCOCH$_3$ | 1 | 4-O—CH$_2$—CH=CH$_2$ |
| 78 | 2-SO$_3$H | —H | —CH$_3$ | 3-NHCOCH$_3$ | 1 | 4-O—CH$_2$—CH=CH$_2$ |
| 79 | 4-SO$_3$H | —H | —H | —H | 1 | 4-O—CH$_2$CH$_2$CH$_3$ |
| 80 | 3-SO$_3$H | —H | —H | —H | 1 | 4-O—CH$_2$CH$_2$CH$_3$ |
| 81 | 4-SO$_3$H | —H | —H | —H | 1 | 4-O—CH(CH$_3$)$_2$ |
| 82 | 3-SO$_3$H | —H | —H | —H | 1 | 4-O—CH(CH$_3$)$_2$ |
| 83 | 4-SO$_3$H | —H | —H | —H | 1 | 4-O—CH$_2$—CH=CH$_2$ |
| 84 | 3-SO$_3$H | —H | —H | —H | 1 | 4-O—CH$_2$—CH=CH$_2$ |

EXAMPLE 85

17.3 parts of sulfanilic acid are suspended in 100 parts of water and to this suspension are slowly added 5.4 parts of sodium carbonate. To the resultant solution are then added a solution of 7 parts of sodium nitrite in 26 parts of water and 116 parts of ice. Then 21 parts of concentrated hydrochloric acid are added and diazotisation is carried out in conventional manner at 0°–5° C. After 2 hours, excess nitrite is destroyed with a minor amount of sulfamic acid. The diazotisation mixture is slowly run into a solution, cooled to 0°–5° C., of 17 parts of 2-(2-amino-4-methylphenoxy)ethyl methyl ether in 100 parts of 2N hydrochloric acid, while keeping the pH constant at c. 5 by addition of solid sodium carbonate. The coupling is complete after stirring for ½ hour at 0°–5° C. and for a further 2 hours at room temperature. The pH is adjusted to c. 4.5 with 4N hydrochloric acid and the precipitate is filtered with suction, washed with a 5% solution of sodium chloride and dried at 60° C. in a drying oven. Yield: 35 parts of a monoazo dye.

36.5 parts of this monoazo dye are dissolved in 800 parts of water at 45° C. by adding a minor amount of a 30% solution of sodium hydroxide. The pH is then 8–9. With stirring, a solution of 7 parts of sodium nitrite in 26 parts of water and 80 parts of an aqueous solution of 1-naphthalenesulfonic acid (31%) are added to this solution and, after stirring for 1 hour at 45° C., the diazotisation is complete. Excess nitrite is destroyed with sulfamic acid. The diazotisation mixture is then slowly run into a weakly alkaline solution, cooled to 0° C., of 10 parts of phenol in 500 parts of water. The coupling is complete after stirring for 2 hours at room temperature. The reaction mixture is warmed to 40° C. and 150 parts of a 10% solution of sodium chloride is added. The precipitate is filtered with suction, washed with a 10% solution of sodium chloride and dried at 60° C., giving 42 parts of a bisazo dye in the form of a dark orange powder.

5 parts of this bisazo dye are dissolved in 50 parts of water at pH 11. The solution is then heated to 50°–55° C. and 3 parts of dimethyl sulfate are added over 10 minutes, while keeping the pH at 11 by the addition of sodium hydroxide. The solution is stirred for 3 hours at 50°–55° C., then cooled to 0° C. and 5 parts of sodium chloride are added. The precipitate is filtered with suction, washed with a 20% solution of sodium chloride and dried, giving a dye that, in the form of the free acid, corresponds to the compound of formula

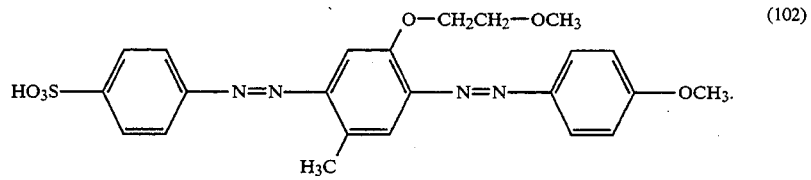

The dye of formula (102) dyes natural and synthetic polyamide fibre material in orange shades.

EXAMPLES 86 TO 148

The dyes of formula

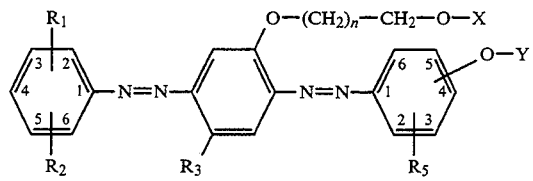

given in the form of the free acid, wherein R$_1$, R$_2$, R$_3$, R$_5$, —O—Y, X and n have the meanings given in Table 2, can be obtained in accordance with the general procedure described in Example 85. Yellow to orange dyeings are produced on natural and synthetic polyamide fibre material with the dyes of Table 2.

TABLE 2

| Ex. | R$_1$ | R$_2$ | R$_3$ | R$_5$ | n | —O—Y | X |
|---|---|---|---|---|---|---|---|
| 86 | 2-SO$_3$H | 4-NHCOCH$_3$ | —CH$_3$ | —H | 1 | 4-OCH$_3$ | —H |
| 87 | 2-SO$_3$H | 5-NHCOCH$_3$ | —CH$_3$ | —H | 1 | 4-OCH$_3$ | —H |
| 88 | 4-SO$_3$H | —H | —CH$_3$ | 3-NHCOCH$_3$ | 1 | 4-OCH$_3$ | —H |
| 89 | 3-SO$_3$H | —H | —CH$_3$ | 3-NHCOCH$_3$ | 1 | 4-OCH$_3$ | —H |
| 90 | 2-SO$_3$H | —H | —CH$_3$ | 3-NHCOCH$_3$ | 1 | 4-OCH$_3$ | —H |

TABLE 2-continued

| Ex. | R$_1$ | R$_2$ | R$_3$ | R$_5$ | n | —O—Y | X |
|---|---|---|---|---|---|---|---|
| 91 | 4-SO$_3$H | —H | —CH$_3$ | 3-N-C(=O)-cyclopentyl | 1 | 4-OCH$_3$ | —H |
| 92 | 3-SO$_3$H | —H | —CH$_3$ | 3-N-C(=O)-cyclopentyl | 1 | 4-OCH$_3$ | —H |
| 93 | 2-SO$_3$H | —H | —CH$_3$ | 3-N-C(=O)-cyclopentyl | 1 | 4-OCH$_3$ | —H |
| 94 | 3-SO$_3$H | 4-NHCOC$_2$H$_5$ | —CH$_3$ | —H | 1 | 4-OCH$_3$ | —H |
| 95 | 2-SO$_3$H | 4-NHCOC$_2$H$_5$ | —CH$_3$ | —H | 1 | 4-OCH$_3$ | —H |
| 96 | 2-SO$_3$H | 5-NHCOC$_2$H$_5$ | —CH$_3$ | —H | 1 | 4-OCH$_3$ | —H |
| 97 | 4-SO$_3$H | —H | —CH$_3$ | —H | 2 | 4-OCH$_3$ | —H |
| 98 | 3-SO$_3$H | —H | —CH$_3$ | —H | 2 | 4-OCH$_3$ | —H |
| 99 | 2-SO$_3$H | —H | —CH$_3$ | —H | 2 | 4-OCH$_3$ | —H |
| 100 | 3-SO$_3$H | 4-NHCOCH$_3$ | —CH$_3$ | —H | 2 | 4-OCH$_3$ | —H |
| 101 | 4-SO$_3$H | —H | —H | —H | 2 | 4-OCH$_3$ | —H |
| 102 | 3-SO$_3$H | —H | —H | —H | 2 | 4-OCH$_3$ | —H |
| 103 | 2-SO$_3$H | —H | —H | —H | 2 | 4-OCH$_3$ | —H |
| 104 | 4-CONHCH$_2$CH$_2$SO$_3$H | —H | —CH$_3$ | —H | 1 | 4-OCH$_3$ | —H |
| 105 | 3-CONHCH$_2$CH$_2$SO$_3$H | —H | —CH$_3$ | —H | 1 | 4-OCH$_3$ | —H |
| 106 | 3-NH—CO—CH$_2$SO$_3$H | —H | —CH$_3$ | —H | 1 | 4-OCH$_3$ | —H |
| 107 | 4-NH—CO—CH$_2$SO$_3$H | —H | —CH$_3$ | —H | 1 | 4-OCH$_3$ | —H |
| 108 | 3-SO$_3$H | 4-NHCOCH$_3$ | —H | —H | 1 | 4-OCH$_3$ | —H |
| 109 | 3-SO$_3$H | 4-NHCOCH$_3$ | —CH$_3$ | —H | 1 | 4-OCH$_3$ | —H |
| 110 | 4-SO$_3$H | —H | —CH$_3$ | 3-CH$_3$ | 2 | 4-OCH$_3$ | —H |
| 111 | 3-SO$_3$H | —H | —CH$_3$ | 3-CH$_3$ | 2 | 4-OCH$_3$ | —H |
| 112 | 2-SO$_3$H | —H | —CH$_3$ | 3-CH$_3$ | 2 | 4-OCH$_3$ | —H |
| 113 | 3-SO$_3$H | 4-NHCOCH$_3$ | —CH$_3$ | —H | 1 | 4-OC$_2$H$_5$ | —H |
| 114 | 2-SO$_3$H | 4-NHCOCH$_3$ | —CH$_3$ | —H | 1 | 4-OC$_2$H$_5$ | —H |
| 115 | 2-SO$_3$H | 5-NHCOCH$_3$ | —CH$_3$ | —H | 1 | 4-OC$_2$H$_5$ | —H |
| 116 | 4-SO$_3$H | —H | —CH$_3$ | 3-NHCOCH$_3$ | 1 | 4-OC$_2$H$_5$ | —H |
| 117 | 3-SO$_3$H | —H | —CH$_3$ | 3-NHCOCH$_3$ | 1 | 4-OC$_2$H$_5$ | —H |
| 118 | 2-SO$_3$H | —H | —CH$_3$ | 3-NHCOCH$_3$ | 1 | 4-OC$_2$H$_5$ | —H |
| 119 | —H | 3-NHCOCH$_2$SO$_3$H | —CH$_3$ | —H | 1 | 4-OC$_2$H$_5$ | —H |
| 120 | —H | 4-NHCOCH$_2$SO$_3$H | —CH$_3$ | —H | 1 | 4-OC$_2$H$_5$ | —H |
| 121 | 4-SO$_3$H | —H | —CH$_3$ | —H | 2 | 4-OC$_2$H$_5$ | —H |
| 122 | 3-SO$_3$H | —H | —CH$_3$ | —H | 2 | 4-OC$_2$H$_5$ | —H |
| 123 | 2-SO$_3$H | —H | —CH$_3$ | —H | 2 | 4-OC$_2$H$_5$ | —H |
| 124 | 4-SO$_3$H | —H | —H | —H | 2 | 4-OC$_2$H$_5$ | —H |
| 125 | 3-SO$_3$H | —H | —H | —H | 2 | 4-OC$_2$H$_5$ | —H |
| 126 | 2-SO$_3$H | —H | —H | —H | 2 | 4-OC$_2$H$_5$ | —H |
| 127 | 4-SO$_3$H | —H | —CH$_3$ | —H | 1 | 4-OCH$_3$ | —CH$_3$ |
| 128 | 3-SO$_3$H | —H | —CH$_3$ | —H | 1 | 4-OCH$_3$ | —CH$_3$ |
| 129 | 2-SO$_3$H | —H | —CH$_3$ | —H | 1 | 4-OCH$_3$ | —CH$_3$ |
| 130 | 4-SO$_3$H | —H | —CH$_3$ | —H | 1 | 4-OC$_2$H$_5$ | —CH$_3$ |
| 131 | 3-SO$_3$H | —H | —CH$_3$ | —H | 1 | 4-OC$_2$H$_5$ | —CH$_3$ |
| 132 | 2-SO$_3$H | —H | —CH$_3$ | —H | 1 | 4-OC$_2$H$_5$ | —CH$_3$ |
| 133 | 3-SO$_3$H | 4-NHCOCH$_3$ | —CH$_3$ | —H | 1 | 4-OCH$_3$ | —CH$_3$ |
| 134 | 2-SO$_3$H | 4-NHCOCH$_3$ | —CH$_3$ | —H | 1 | 4-OCH$_3$ | —CH$_3$ |
| 135 | 2-SO$_3$H | 5-NHCOCH$_3$ | —CH$_3$ | —H | 1 | 4-OCH$_3$ | —CH$_3$ |
| 136 | 4-SO$_3$H | —H | —CH$_3$ | 3-NHCOCH$_3$ | 1 | 4-OCH$_3$ | —CH$_3$ |
| 137 | 3-SO$_3$H | —H | —CH$_3$ | 3-NHCOCH$_3$ | 1 | 4-OCH$_3$ | —CH$_3$ |
| 138 | 2-SO$_3$H | —H | —CH$_3$ | 3-NHCOCH$_3$ | 1 | 4-OCH$_3$ | —CH$_3$ |
| 139 | 4-SO$_3$H | —H | —H | —H | 1 | 4-OCH$_3$ | —CH$_3$ |
| 140 | 3-SO$_3$H | —H | —H | —H | 1 | 4-OCH$_3$ | —CH$_3$ |
| 141 | 2-SO$_3$H | —H | —H | —H | 1 | 4-OCH$_3$ | —CH$_3$ |
| 142 | 3-SO$_3$H | 4-NHCOCH$_3$ | —H | —H | 1 | 4-OCH$_3$ | —CH$_3$ |
| 143 | 2-SO$_3$H | 4-NHCOCH$_3$ | —H | —H | 1 | 4-OCH$_3$ | —CH$_3$ |
| 144 | 2-SO$_3$H | 5-NHCOCH$_3$ | —H | —H | 1 | 4-OCH$_3$ | —CH$_3$ |
| 145 | 4-SO$_3$H | —H | —CH$_3$ | 3-CH$_3$ | 1 | 4-OCH$_3$ | —CH$_3$ |
| 146 | 4-SO$_3$H | —H | —CH$_3$ | —H | 1 | 4-OC$_2$H$_5$ | —CH$_3$ |
| 147 | 3-SO$_3$H | —H | —CH$_3$ | 3-CH$_3$ | 1 | 4-OCH$_3$ | —CH$_3$ |
| 148 | 3-SO$_3$H | —H | —CH$_3$ | —H | 1 | 4-OC$_2$H$_5$ | —CH$_3$ |

EXAMPLE 149

15 parts of 3-aminoacetanilide are suspended in 100 parts of water and to this suspension are added a solution of 7 parts of sodium nitrite in 26 parts of water. The resultant grey suspension is stirred for 10 minutes at 0°–5° C. Then a mixture of 21 parts of concentrated hydrochloric acid and 125 parts of ice-water are added dropwise and the dark yellow solution is stirred for 1.5 hours at 0° C. Thereafter excess nitrite is destroyed with sulfamic acid. After filtration, the solution of the diazonium salt is run into a solution, cooled to 0°–5° C., of 17 parts of 2-(2-amino-4-methylphenoxy)ethanol in 150 parts of 2N hydrochloric acid, while keeping the pH at c. 5–6. After addition of a further 100 parts of water, the dark red suspension is stirred for 2 hours. The suspension is filtered and the filter product is washed with a small amount of water and then dried, giving 31.5 parts of a monoazo dye in the form of a red powder.

32.8 parts of this monoazo dye are suspended in 500 parts of water and 22 parts of concentrated hydrochloric acid are added. The suspension is cooled to 0°–5° C. Then 7 parts of sodium nitrite in 26 parts of water are added and stirring is continued for 1 hour at 0° C. Excess nitrite is destroyed with sulfamic acid. The diazotisation mixture is then run into a weakly alkaline solution cooled to 0° C. of 10 parts of phenol in 250 parts of water. The reaction mixture is then stirred for 2 hours at 0°–5° C. and at a pH of c. 8. The dye is collected by suction filtration, washed with a small mount of water and dried, giving 38.2 parts of a bisazo dye in the form of a brown powder.

3.5 parts of this bisazo dye are dissolved in 25 parts of dimethyl methanephosphonate and 1.7 parts of finely ground potassium carbonate are added. The reaction mixture is heated to c. 125° C. and stirred for 3 hours. After cooling to room temperature, 200 parts of water are added. The orange precipitate is collected by suction filtration, washed with water and dried at 60° C., giving 3.4 parts of a brownish orange dye powder.

2.3 parts of this dye are added in portions to 25 parts of concentrated sulfuric acid of 0°–25° C. When the addition is complete, the reaction mixture is stirred for 1.5 hours at 0° C., then poured slowly on to 250 parts of ice. After addition of 25 parts of sodium chloride, the resultant black precipitate is collected by suction filtration and suspended in 100 parts of water. The suspension is warmed to c. 50° C., adjusted to a pH of c. 9 with a minor amount of a concentrated solution of sodium hydroxide, and the dye is salted out with 24 parts of sodium chloride. The orange precipitate is isolated by filtration, washed with a 2% solution of sodium chloride and dried, giving 2.9 parts of a dye which, in the form of the free acid, corresponds to the compound of formula

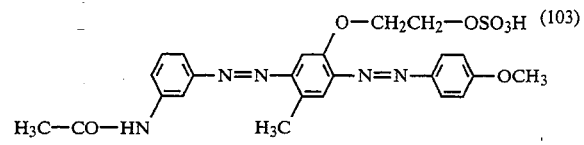

An orange dyeing is produced with the dye of formula (103) on natural and synthetic polyamide fibre material.

EXAMPLES 150–152

The dyes of formulae

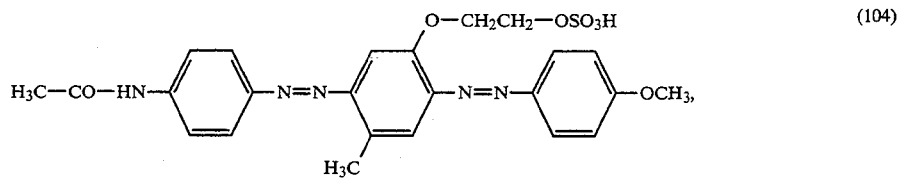

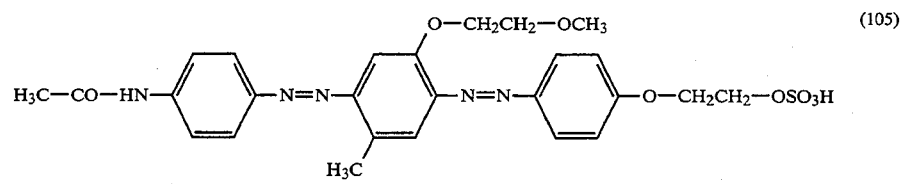

and

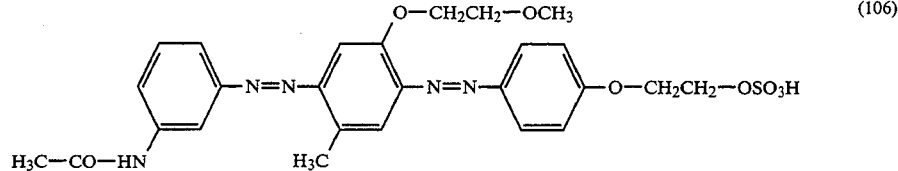

can be obtained in accordance with the general procedure described in Example 149. Orange dyeings are produced with the dyes of formulae (104), (105) and (106) on natural and synthetic polyamide fibre material.

Dyeing Example I 10 parts of polyamide 66 fabric are dyed in 500 parts of an aqueous liquor containing 2 g/l of ammonium acetate and adjusted to pH 5 with acetic acid. The concentration of dye of Example 1 is 0.7%, based on the weight of the fabric. The dyeing time is 30 to 90 minutes at a temperature of 98° C. The dyed polyamide 66 fabric is then removed from the bath and washed and dried in conventional manner. The polyamide 66 fabric is dyed in a pure orange shade of good allround fastness properties.

Dyeing Example II 10 parts of polyamide 66 fabric are dyed in 500 parts of an aqueous liquor containing 1 g/l of monosodium phosphate and adjusted to pH 6 with disodium phosphate. The concentration of dye of Example 1 is 1%, based on the weight of the fabric. The dyeing time is 30 to 90 minutes at a temperature of 98° C. The dyed polyamide 66 fabric is then removed from the bath and washed and dried in conventional manner. The polyamide 66 fabric is dyed in a pure orange shade of good allround fastness properties.

Dyeing Example III 10 parts of woollen piece goods are dyed in 500 parts of an aqueous liquor. Based on the weight of the fabric, the liquor contains 0.45% of the dye of Example 1, 5 % of calcined Glauber's salt and 2% of 80% acetic acid. The dyeing time is 30 to 90 minutes at a temperature of 98° C. The orange dyeing obtained on the conventionally washed and dried woollen fabric has very good allround fastness properties.

Printing Example (Textile printing).

Woven polyamide 6 or polyamide 66 fabric is printed on a standard textile printing machine with a paste comprising, based on 1000 g of print paste:
a) 20 g of the dye of Example 1,
b) 50 g of urea
c) 50 g of thiodiethylene glycol,
d) 320 g of water,
e) 500 g of plant seed gum or guar gum derivative, 10%, and
f) 60 g of ammonium tartrate solution of 15 Bé.

The printed fabric is dried at 70°-80° C. in a drying oven and then steamed for 20-30 minutes with saturated steam of 101°-103° C. The goods are then washed cold for 10 minutes, washed for 15 minutes at 50°-60° C. with 2 g/l of a synthetic detergent, washed once more and then dried. A level orange print with sharp contours and good fastness properties is obtained.

What is claimed is:

1. An azo dye of the formula

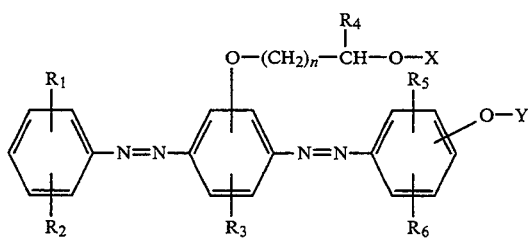

(1)

wherein
$R_1$, $R_2$, $R_5$ and $R_6$ are each independently of one another hydrogen, $C_1$-$C_4$alkyl, $C_1$-$C_4$alkoxy, halogen, sulfo, unsubstituted $C_2$-$C_4$alkanoylamino or $C_2$-$C_4$alkanoylamino which is substituted by hydroxy, sulfo or sulfato, or are a radical of formula $-SO_2N(R_7)R_8$, $-CON(R_7)R_8$ or

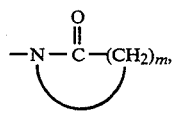

$R_7$ is hydrogen or $C_1$-$C_4$alkyl,
$R_8$ is a radical of formula $-(CH_2)_{1-4}-SO_3H$ and m is 3, 4 or 5,
$R_3$ is hydrogen, $C_1$-$C_4$alkyl, $C_1$-$C_4$alkoxy, unsubstituted $C_2$-$C_4$alkanoylamino or $C_2$-$C_4$alkanoylamino which is substituted by hydroxy, sulfo or sulfato, or is halogen or sulfo,
$R_4$ is hydrogen or $C_1$-$C_4$alkyl,
X is hydrogen, $C_1$-$C_4$alkyl, $C_2$-$C_4$hydroxyalkyl or sulfo, Y is hydrogen, $C_1$-$C_8$alkyl, $C_2$-$C_8$sulfatoalkyl, $C_2$-$C_8$hydroxyalkyl, $C_2$-$C_8$alkyl which is interrupted in the chain by the group —O—,

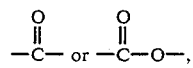

or is $C_3$-$C_8$alkenyl, $C_3$-$C_8$alkynyl or a radical of formula

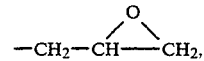

n is 1, 2, 3 or 4, which azo dye of formula (1) contains at least one sulfo or sulfato group; with the proviso that, in the azo dye of the formula (1),
X is $C_1$-$C_4$alkyl, or
Y is $C_2$-$C_8$alkyl which is interrupted in the chain by the group —O—,

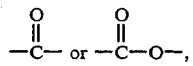

or is $C_3$-$C_8$alkenyl.

2. An azo dye according to claim 1, wherein $R_1$ is hydrogen or sulfo, $R_2$ and $R_5$ are each independently of the other hydrogen, $C_1$-$C_4$alkyl, $C_1$-$C_4$alkoxy, halogen, unsubstituted $C_2$-$C_4$alkanoylamino or $C_2$-$C_4$alkanoylamino which is substituted by hydroxy, sulfo or sulfato, or is a radical of formula

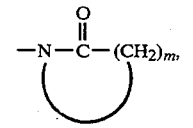

wherein m is 3, 4 or 5, and $R_6$ is hydrogen.

3. An azo dye according to claim 1, wherein $R_3$ is hydrogen or $C_1$-$C_4$alkyl.

4. An azo dye according to claim 1, wherein $R_4$ is hydrogen.

5. An azo dye according to claim 1, wherein n is 2, 3 or 4.

6. An azo dye according to claim 1, wherein X is $C_1$-$C_4$alkyl.

7. An azo dye according to claim 1, wherein Y is $C_2$-$C_8$alkyl which is interrupted in the chain by the group —O—

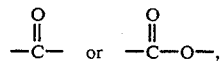

or $C_3$-$C_8$alkenyl.

8. An azo dye according to claim 1, wherein Y is $C_3$-$C_8$alkenyl.

9. An azo dye according to claim 1, wherein one of $R_2$ and $R_5$ is unsubstituted $C_2$-$C_4$alkanoylamino or $C_2$-$C_4$alkanoylamino which is substituted by hydroxy, sulfo or sulfato, or is a radical of formula

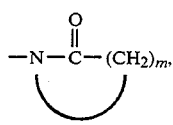

wherein m is 3, 4 or 5.

10. An azo dye according to claim 1 of formula

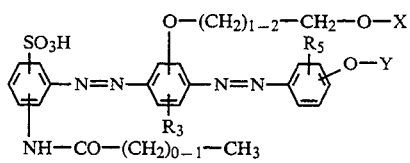

-continued
or

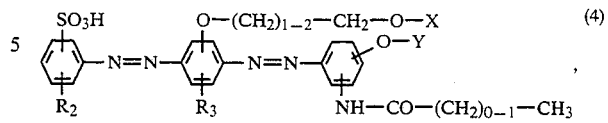

wherein $R_3$ is hydrogen or $C_1$-$C_4$alkyl, $R_2$ and $R_5$ are hydrogen, $C_1$-$C_4$alkyl, $C_1$-$C_4$alkoxy, halogen or a radical of formula —NH—CO—$(CH_2)_{0-1}$—$CH_3$, and X and Y are as defined in claim 1.

11. A process for dyeing or printing of nitrogen-containing or hydroxyl group containing fibre material which comprises applying to the fibre material an azo dye as claimed in claim 1.

12. A process according to claim 11 wherein the fibre material is natural or synthetic polyamide fibre material.

* * * * *